US005569354A

United States Patent [19]

Day

[11] Patent Number: 5,569,354

[45] Date of Patent: Oct. 29, 1996

[54] TAPE CUTTING APPARATUS

[75] Inventor: Robert C. L. Day, Cambridge, United Kingdom

[73] Assignee: Esselte N.V., St. Niklaas, Belgium

[21] Appl. No.: 266,817

[22] Filed: Jun. 27, 1994

[30] Foreign Application Priority Data

Jul. 12, 1993 [GB] United Kingdom .................. 9314389

[51] Int. Cl.$^6$ .................................................. B32B 35/00

[52] U.S. Cl. ............................ 156/584; 156/344; 83/176; 83/658; 83/694; 83/858

[58] Field of Search ..................................... 156/515, 530, 156/584, 344; 83/175, 176, 440, 446, 509, 658, 694, 858; 72/186, 331, 338

[56] References Cited

U.S. PATENT DOCUMENTS

| | | | |
|---|---|---|---|
| 3,533,616 | 10/1970 | Bettenhausen | 83/175 X |
| 3,755,049 | 8/1973 | Leloux | 156/584 |
| 4,177,104 | 12/1979 | Parker | 156/584 |
| 5,066,152 | 11/1991 | Kuzuya et al. | 83/861 X |

FOREIGN PATENT DOCUMENTS

| | | |
|---|---|---|
| 0286961 | 10/1988 | European Pat. Off. . |
| 0526213 | 3/1993 | European Pat. Off. . |
| 2008028 | 5/1979 | United Kingdom . |

*Primary Examiner*—Mark A. Osele
*Attorney, Agent, or Firm*—Pennie & Edmonds

[57] ABSTRACT

An apparatus for separating tape at a cut edge is described in which a bend is formed in the tape and in which a wall portion acts against the cut edge of the tape so that as the tape is drawn to straighten it, there is resilience in an upper layer of the tape which overcomes the adhesive strength between upper and lower layers and causes them to separate at the cut edge of the tape.

16 Claims, 2 Drawing Sheets

TAPE CUTTING APPARATUS

FIELD OF THE INVENTION

The present invention relates to tape cutting apparatus and is particularly but not exclusively concerned with cutting tape used in thermal printing devices.

BACKGROUND OF THE INVENTION

Thermal printing devices of the type with which the present invention is primarily concerned operate with a supply of tape arranged to receive an image and a means for transferring image onto the tape. In one form, a tape holding case holds a supply of image receiving tape and a supply of an image transfer ribbon, the image receiving tape and the transfer ribbon being passed in overlap through a printing zone of the printing device. A printing device operating with a tape holding case of this type is described for example in EP-A-0267890 (Varitronics, Inc.). Other printing devices have been made in which letters are transferred to an image receiving tape by a dry lettering or dry film impression process. In all of these printing devices, the construction of the image receiving tape is substantially the same. That is, it comprises an upper layer for receiving an image which is secured to a releaseable backing layer by a layer of adhesive. Once an image or message has been printed on the tape, it is desired to cut off that portion of the tape to enable it to be used as a label. For this purpose, it is necessary to remove the releaseable backing layer from the upper layer to enable the upper layer to be secured to a surface by means of the adhesive layer. With existing printing devices, it is difficult to remove the releaseable backing layer from the upper layer: it is necessary first to separate the closely adhered end portions of the releaseable backing layer and the upper layer, for example using a fingernail or tweezers so that the separated end portion of the releaseable backing layer can be finger gripped to peel it off the adhesive layer. This is a relatively difficult procedure and furthermore can result in the ends of the label being damaged in the process.

There have been several attempts to solve this problem. Most such attempts have sought to rely on the provision of a so-called tab cut. In these devices, a first cut is made completely through all the layers of the tape to cut off a portion of the tape and at the same time a cut is made through only one layer of the tape. This provides a "tab" which, in theory, can be peeled away reasonably easily. While a tab cut has been implemented successfully with relatively thick, stiff upper layers there are significant difficulties in implementing so-called tab cut devices for tapes of the type used in thermal printing devices, where the upper layer is generally a thin resilient polyester material. Although there have been several proposals, no such tab cut has successfully been implemented in a thermal printing device. By way of example, reference is made to EP-A-031209 which describes one attempt to form a tab cut system, which provides a cut only through the backing layer.

Reference is also made to EP-0526213 which provides a different solution to the problem of enabling the releaseable backing sheet to be removed easily by providing a cutting system which causes the end portions of the tape to separate as a result of forming a bend in the tape before cutting.

The principle of forming a bend in the tape relies upon the difference in resilience between the image receiving tape and the backing sheet. If the backing sheet lies on the inner radius of the bend, the natural resilience of the image receiving tape will cause it to lift at the cut edge and to separate from the backing sheet against the strength of the adhesive layer. However, it can be difficult to bend the tape reliably around an appropriate radius to achieve a consistent result in separation at the cut edge of a tape.

SUMMARY OF THE INVENTION

According to the present invention there is provided an apparatus for separating an upper layer from a lower layer against an adhesive strength between the upper and lower layers at the cut edge of a portion of tape, the apparatus comprising a tape separating member at which a bend can be formed in the tape and which has a wall portion acting against the cut edge of the tape so that as the tape is drawn out of the tape separating member to straighten it the resilience in the upper layer overcomes the adhesive strength between upper and lower layers and causes them to separate at the cut edge of the tape.

Preferably, the tape separating member has a recess having a foremost wall and a rearmost wall in the direction of withdrawal of the tape, the rearmost wall providing said wall portion.

Preferably, the wall portion includes a notch which serves to retain the cut edge of the tape as the tape is drawn out.

Preferably a slide member cooperates with the tape separating member to cause a bend in said tape. The slide member can be attached to a cutting blade which cuts the tape to form said cut edge before the bend is formed.

In the preferred embodiment, a movable arm or slide pushes the freshly cut end of a label into a recess. The arm or slide is then retracted. The deformed end of the label is retained in the recess (provided the latter is sufficiently deep) by friction between the label and the walls of the recess. The cut edge of the label can preferably be trapped in a notch which prevents it from slipping upwards out of the recess. There is thus the advantage that the label does not drop out of the printer after being cut, as is the case with other known label printers.

When the user begins to pull the label out of the printer, the trapped end remains bent until the elastic forces in the plastic label material overcome the remaining friction at the recess walls, allowing it to spring free and straighten.

The paper layer, being less elastic, remains trapped momentarily longer than the plastic layer, so that full separation occurs between the layers over a distance slightly greater than the width of the recess.

For a better understanding of the present invention and to show how the same may be carried into effect reference will now be made by way of example to the accompanying drawings.

DESCRIPTION OF THE PREFERRED EMBODIMENTS

Figure 1:
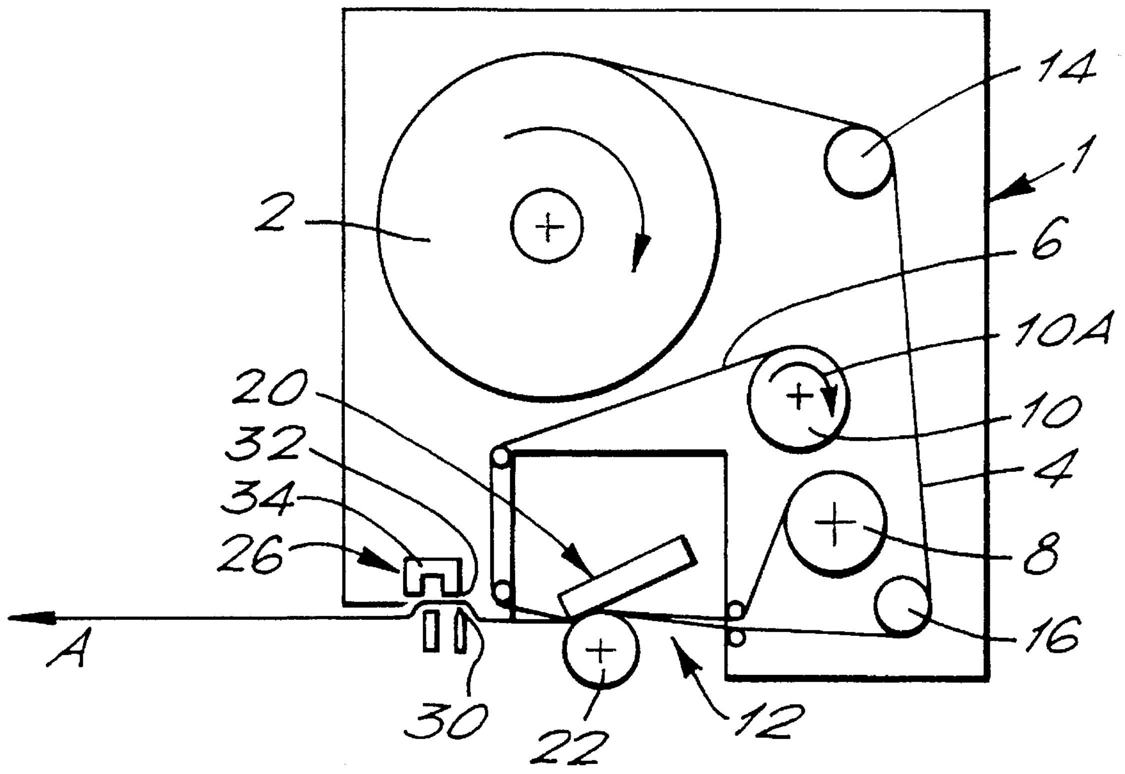
FIG. 1 illustrates diagrammatically the main elements of a printing apparatus with which the tape separating member can be used.
Figure 2:
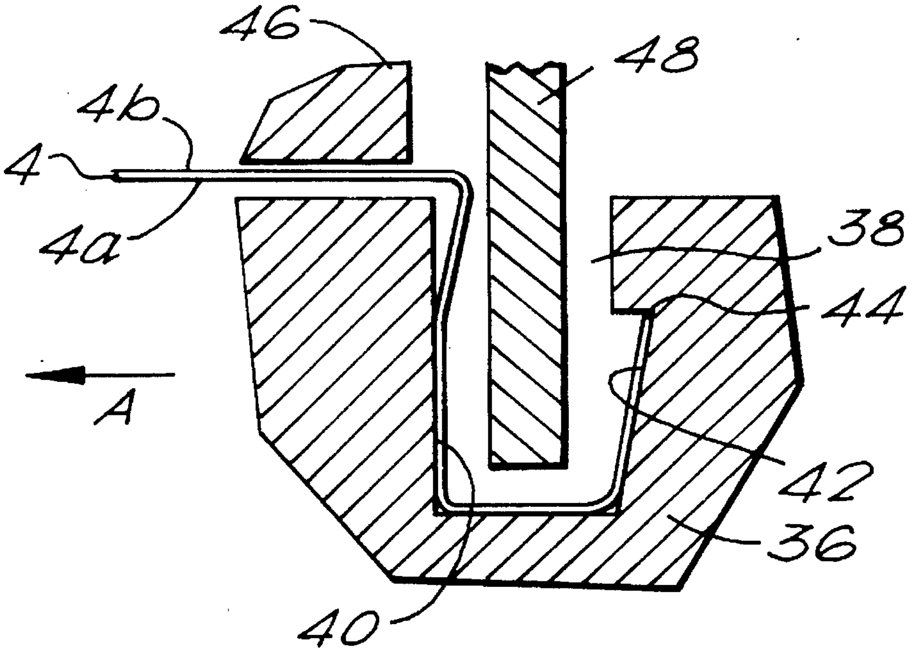
FIGS. 2 to 4 illustrate the tape separating apparatus in various stages of use.

In FIG. 1, reference numeral 1 designates a tape holding case or cassette. The tape holding case contains a supply spool 2 of an image receiving tape 4. The image receiving tape comprises an upper layer 4*a* (FIG. 2) which receives a printed image. The upper layer can for example be polyester or paper, and is generally a thin resilient material. The underside of the upper layer is coated with an adhesive layer to which is secured a releaseable backing layer 4*b* (FIG. 2). The construction of the image receiving tape 4 is described in more detail hereinafter with reference to the tape cutting apparatus.

The cassette 1 also houses an image transfer ribbon 6. The ribbon 6 extends from a supply spool 8 to a take-up spool 10. The take-up spool 10 is driven as indicated by arrow 10A in a direction to cause the ribbon 6 to be fed from the supply spool 8 to the take-up spool 10 via a print zone generally designated 12. The image receiving tape 4 is also guided through the print zone 12 overlapped with the transfer ribbon 6. Reference numerals 14 and 16 denote guide posts for guiding the image receiving tape 4 through the cassette 1.

The cassette 1 is intended to cooperate with a thermal printing device. The printing device carries a print head 20 and a platen 22. The print head is movable between an operative position shown in FIG. 1 in which it is in contact with the platen 22 and in which the image receiving tape and transfer ribbon are pinched in overlap between the print head and the platen and an inoperative position in which the tapes are released to enable the cassette to be removed. With the print head in contact with the platen, an image is transferred to the image receiving tape as a result of selectively heating pixels on the thermal print head. Such thermal printing devices are known, one example being illustrated in EP-A-0267890. The platen 22 is rotatable to draw the image receiving tape once printed past the print zone and out of the cassette 1. Once a message has been printed, the image receiving tape is fed to a cutting apparatus 26, which may or may not be integral with the cassette.

The cutting apparatus 26 includes a cutter support member carrying a blade 30 which acts against an anvil 32 to cut off the printed portion of the tape. The cutting apparatus 26 also includes a tape separating apparatus 34. The tape separating apparatus 34 comprises a tape separating member 36 which is indicated in section in FIG. 2 and in which is defined a recess 38 having foremost and rearmost walls 40,42. The directions foremost and rearmost are taken in the direction of withdrawal of the tape from the apparatus. This direction is denoted by arrow A in FIG. 2. The tape 4 is shown in FIG. 2 with its image receiving layer 4*a* on the lower side and the releaseable backing layer 4*b* on the upper side. There is formed in the rearmost wall 42 of the recess 38 a notch 44 which serves to trap the cut edge of the tape as will be described later. Reference numeral 46 denotes a guide wall for the tape as it is withdrawn from the tape separating apparatus 34 in the direction of arrow A. The tape separating apparatus includes a slide member 48 which is slidable into the recess 38. The slide member does not trap or fix the tape 4 but merely causes a bend to be formed in the tape 4 so that the tape is located in the recess 38, against the walls 40 and 42. The end of the tape is in contact with the wall over most of its length (see FIG. 2).

The tape separating member 36 can be formed as part of the cassette 1 or as part of the printing device itself. Alternatively, it can be a separate component altogether.

Figure 3:
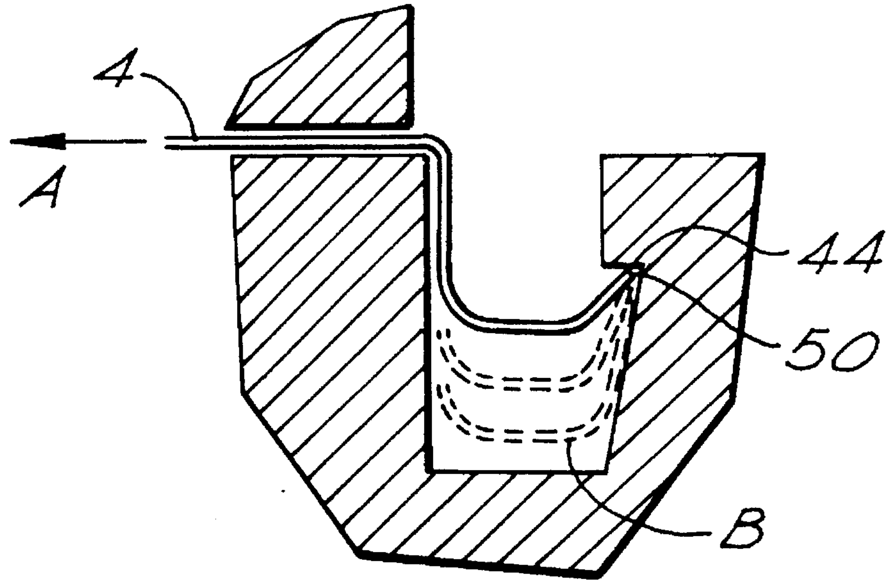
Figure 4:
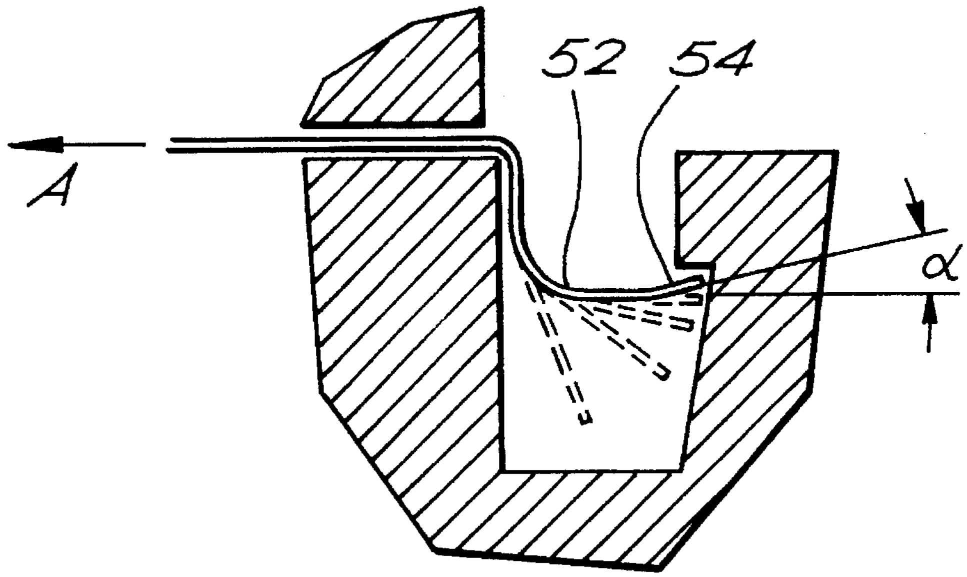

The principle of the present invention will now be described with reference to FIGS. 2 and 3. As the user withdraws the tape 4 by pulling it in the direction of arrow A out of the tape separating member 36, the bend B in the tape begins to straighten as a result of the pulling action.

There comes a point when the only part of the tape in contact with the wall 42 is the cut edge 50. At this point, the notch 44 is important as it prevents the cut edge 50 of the tape from slipping upwards allowing the tape to straighten. However, the notch is not essential provided that the wall 42 has a surface finish with a higher coefficient of friction. The angle in FIG. 3 denotes the angle between a horizontal tangent to the bend B in the tape 52 and the end region of the tape 54 adjacent the end 50.

Once the point is reached when $\alpha$ is less than about 85° (depending on the incline of wall 42), the area of contact between tape and wall 42 is dramatically reduced—friction at the contact edge increases accordingly. However, as $\alpha$ approaches zero, the component of the elastic forces acting normal to wall 42 and hence the friction between the tape and wall 42 also approach zero.

The "peel-flick" occurs when a) the elastic forces in the polyester layer overcome friction between the cut end of the polyester and wall 42 and the adhesive forces holding the tape layers together and b) the lower elastic forces in the paper layer are not yet sufficient to overcome friction between it and wall 42. The paper layer should be cut to the same length as the polyester, or overlap slightly.

The elastic forces in the image receiving layer arise as a result of the natural resilience of the material used for the image receiving layer, generally a plastics material.

What is claimed is:

1. An apparatus for separating an upper layer from a lower layer against an adhesive strength between the upper and lower layers at a cut edge of a portion of tape, the apparatus comprising a tape separating member at which a bend can be formed in the tape and which has a wall portion acting against the cut edge of the tape, wherein the cut edge of the tape is retained by the tape separating member by friction between the cut edge and the wall portion so that, as the tape is drawn out of the tape separating member against said friction to straighten it, the resilience in the upper layer overcomes the adhesive strength between the upper and lower layers and causes them to separate at the cut edge of the tape.

2. Apparatus according to claim 1 wherein the tape separating member has a recess having a foremost wall and rearmost wall in the direction of withdrawal of the tape, the rearmost wall providing said wall portion.

3. Apparatus according to claim 1 wherein the wall portion includes a notch which serves to retain the cut edge of the tape as the tape is drawn out.

4. Apparatus according to claim 1 which comprises a slide member adapted to cooperate with the tape separating member to cause a bend in said tape.

5. Apparatus according to claim 4 wherein the slide member is attached to a cutting blade which cuts the tape to form said cut edge before the bend is formed.

6. A tape holding case comprising a tape separating member at which a bend can be formed in tape having an upper layer and a lower layer secured to one another by adhesive, the tape separating member also having a wall portion arranged to act against a cut edge of the tape, wherein the cut edge of the tape is retained by the tape separating member by friction between the cut edge and the wall portion so that, as the tape is drawn out of the tape separating member against said friction to straighten it, the resilience in the upper layer overcomes adhesive strength between the upper and lower layers and causes them to separate at the cut edge of the tape.

7. A tape holding case according to claim 6 wherein the tape separating member has a recess having a foremost wall and rearmost wall in the direction of withdrawal of the tape, the rearmost wall providing said wall portion.

8. A tape holding case according to claim 6 wherein the wall portion includes a notch which serves to retain the cut edge of the tape as the tape is drawn out.

9. A tape holding case according to claim 7 wherein the wall portion includes a notch which serves to retain the cut edge of the tape as the tape is drawn out.

10. A tape holding case according to claim 2 wherein the wall portion includes a notch which serves to retain the cut edge of the tape as the tape is drawn out.

11. A tape holding case according to claim 6 in combination with a slide member adapted to cooperate with the tape separating member to cause a bend in said tape.

12. The combination according to claim 11 wherein the slide member is attached to a cutting blade which cuts the tape to form said cut edge before the bend is formed.

13. An apparatus for separating an upper layer from a lower layer against an adhesive strength between the upper and lower layers at a cut edge of a portion of tape, the apparatus comprising a tape separating member at which a bend can be formed in the tape and which has a wall portion which includes a notch which serves to retain a cut edge of the tape so that, as the tape is drawn out of the tape separating member to straighten it, the resilience in the upper layer overcomes the adhesive strength between the upper and lower layers and causes them to separate at the cut edge of the tape.

14. A tape holding case comprising a tape separating member at which a bend can be formed in tape having an upper layer and a lower layer secured to one another by adhesive, the tape separating member having a wall portion including a notch which serves to retain a cut edge of the tape so that as the tape is drawn out of the tape separating member to straighten it, the resilience in the upper layer overcomes the adhesive strength between the upper and lower layers and causes them to separate at the cut edge of the tape.

15. A printing device comprising:

a printing mechanism for printing an image onto an image receiving tape;

a cutter for cutting off a portion of the image receiving tape;

said image receiving tape having an upper layer and a lower layer secured to one another by adhesive; and an apparatus for separating an upper layer from a lower layer against the adhesive strength between the upper and lower layers at a cut edge of a portion of the image receiving tape, the apparatus comprising a tape separating member at which a bend can be formed in the tape and which has a wall portion acting against the cut edge of the tape, wherein the cut edge of the tape is retained by the tape separating member so that, as the tape is drawn out of the tape separating member to straighten it, the resilience in the upper layer overcomes the adhesive strength between upper and lower layers and causes them to separate at the cut edge of the tape.

16. A printing device according to claim 15 in combination with a tape holding case which comprises said apparatus for separating the upper layer from the lower layer of the image receiving tape.

* * * * *